Figures 1, 2:
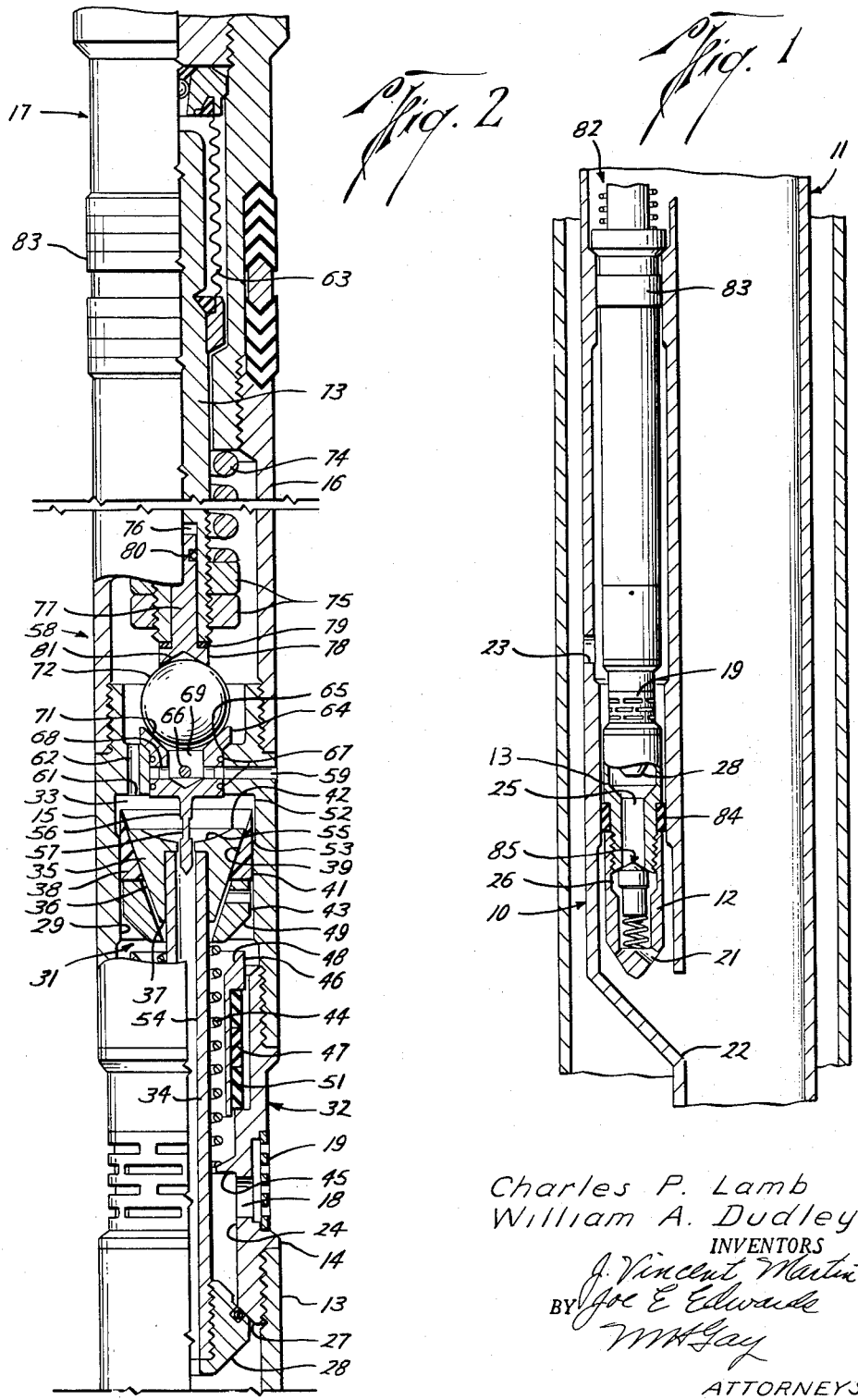

Feb. 18, 1964  C. P. LAMB ETAL  3,121,442
GAS LIFT VALVE
Filed Feb. 1, 1962  2 Sheets-Sheet 1

Charles P. Lamb
William A. Dudley
INVENTORS
BY J. Vincent Martin
Joe E. Edwards
M. H. Gay
ATTORNEYS

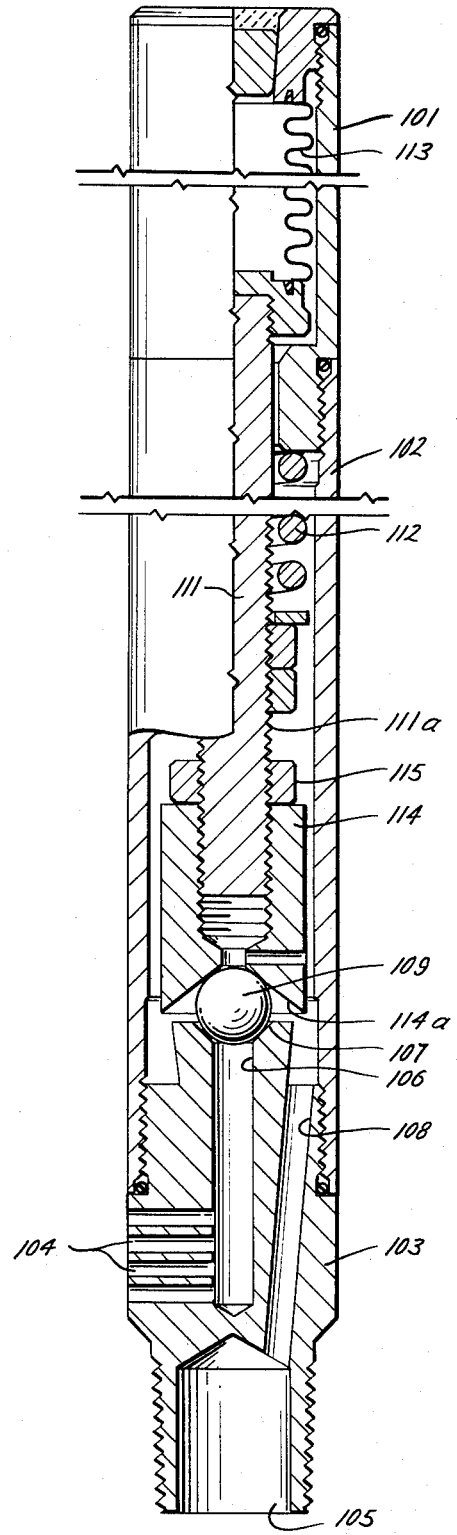

United States Patent Office 3,121,442
Patented Feb. 18, 1964

3,121,442
GAS LIFT VALVE
Charles P. Lamb and William A. Dudley, Dallas, Tex., assignors to Merla Tool Corporation, Dallas, Tex., a corporation of Texas
Filed Feb. 1, 1962, Ser. No. 170,594
2 Claims. (Cl. 137—155)

This invention relates to valves, and more particularly to gas lift valves.

Gas lift valves are designed to open and close at different pressures. This difference is usually referred to as the spread characteristics of the valve. These characteristics are determined by the difference in area of a bellows and a valve seat. Thus, it is usually necessary to make a major change in construction of a valve to change its spread characteristics.

Occasionally conditions develop in a well in which pressure at the outlet of a gas lift valve exceeds pressure at its inlet. For this reason gas lift valves are conventionally provided with separate check valves to prevent reverse flow. Where the valve is of the pilot-operated type, a check valve is sometimes provided in the pilot gas passageway.

One of the problems in the gas lift practice is reducing the necessity for round-tripping the gas lift valves. Failures of the valve member to provide the necessary seal is one of the major causes of removal of gas lift valves for repairs.

It is an object of this invention to provide a gas lift valve in which the spread characteristics of the valve may be readily and easily changed without making a major revision in the construction of the valve.

Another object is to provide a gas lift valve in which the main valve or the pilot valve member, as the case may be, automatically provides its own check valve thus eliminating the need for a separate check valve.

Another object is to provide a gas lift valve in which the valve member of the gas lift valve, or of the pilot valve, as the case may be, has an infinite number of seating surfaces which randomly engage the valve seat to greatly prolong the life of the valve.

Other objects, features and advantages of the invention will be apparent from the drawing, the specification and the claims.

In the drawing, FIGURE 1 is a view partially in vertical section and partially in elevation showing a valve constructed in accordance with this invention in operating position in a tubing string; and, FIGURE 2 is a view partially in half-section and partially in quarter-section illustrating details of a preferred form of valve embodying this invention; and FIGURE 3 is a view partly in half-section and partly in quarter-section through a modified form of valve embodying this invention.

The objects of this invention are all carried out by utilizing a free ball as the valve member. The ball is positioned downstream of the seat and is urged toward the seat by a valve stem. As the ball is free from the valve stem, it may serve as a flow valve and as a check valve to prevent reverse flow through the valve seat. As the ball may be readily removed and replaced by a ball of a different size to change the effective area of the valve seat, the spread characteristics of the valve may be readily changed. As the ball will seat in random position, it is apparent that its life will be much longer than a conventional valve member.

FIGURE 1 illustrates the valve of this invention in position in the side pocket indicated generally at 10 of a mandrel 11 forming a portion of a flow tubing. In the form illustrated, the valve is designed for wire line operation. It will be apparent to those skilled in the art that, by changing the outlet sub 12 to the type commonly used with permanently installed valves, the valve could be secured to a lug on the exterior of a mandrel in the conventional manner. Of course, the side pocket packing would not be utilized as it would serve no useful purpose.

A tubular housing is provided by a number of housing parts for ease of assembly. Beginning at the bottom of the valve, the lowermost part is the bottom sub or cap 12. Above the sub 12 is a packing adapter 13 which is connected to the lower end of the inlet thimble assembly 14. Above the thimble assembly 14 is a valve seat housing 15 which is connected to the lower end of spring housing 16. The upper end of the housing is completed by the upper packing adapter 17.

A fluid inlet is provided in the housing at 18 in the inlet thimble assembly. Preferably, a number of inlet ports 18 are provided and this section of the inlet thimble assembly is surrounded by a screen 19 to screen out trash from the flow stream.

An outlet 21 is provided in the bottom cap and, as shown in FIGURE 1, communicates through port 22 with the interior of the flow tubing provided by mandrel 11. The inlet screen 19 is provided in a section of the side pocket 10 where it communicates with opening 23 so that fluid from the casing annulus may pass from opening 23 to the inlet of the valve 18.

A flow passageway connects the inlet and outlet to convey fluid from the casing into the tubing mandrel 11. This passageway is provided by a bore 24 in the inlet thimble assembly 14, a bore 25 through the lower packing adapter 13, and a bore 26 through the bottom cap 12.

A valve seat is provided at 27 by a downwardly and outwardly facing frusto-conical surface on the lower end of the inlet thimble assembly 14. A main valve member 28 cooperates with the valve seat 27 to control flow of fluid through the valve.

Control of the main valve is provided for by a power assembly. The power assembly is provided by a cylinder 29 in the valve seat housing 15 and a piston indicated generally at 31 reciprocal in cylinder 29.

The cylinder 29 is exposed on its lower side to casing pressure through the bumper assembly indicated generally at 32. The upper end of the cylinder is closed providing a chamber 33 above the piston 31.

The piston 31 is connected to the main valve 28 through stem 34 so that movement of the piston will effect movement of the main valve member.

The piston assembly includes a piston member 35 having a rigid frusto-conical periphery 36 with the small end 37 thereof facing the main valve member.

The seal for the piston assembly is provided by an annular seal member 38 mounted on the piston member 35. The seal member is formed of polytetrafluoroethylene, commonly known as "Teflon," or some other material having the same characteristics. An important characteristic of this material is its low coefficient of friction which permits it to provide a seal with very light frictional forces during piston movement and yet which will seal against several thousand pounds of differential, at least, during the stationary period. Teflon will withstand temperatures on the order of 300° F. indefinitely, and will withstand attack from all chemicals normally found in an oil well. Teflon will mechanically absorb by imbedding all particles too small for it to wipe off of the cylinder wall 29, thus minimizing the damage to the cylinder wall. Teflon has good ability to absorb impact without permanent deformation.

The Teflon seal ring is formed with an inner frusto-conical wall 39 to conform to the outer periphery 36 of the piston member. The Teflon seal 38 has an outer cylindrical wall 41 to conform to the wall of the cylinder 29.

Preferably, the angle of the frusto-conical wall 36 on the piston member 35 is sufficient to be self-releasing from the seal member to avoid sticking of the seal member to the piston. It is also preferred that the outer diameter of the seal ring be slightly larger than the diameter of cylinder 29 to give a slight preloading of the seal ring against the cylinder.

Means are provided for urging the seal member upward toward the large end 42 of piston member 35. In the preferred form a bumper washer 43 bears against the lower end of seal 38 and a spring 44 is held in compression between the bumper washer 43 and an inwardly extending flange 45 on the lower end of valve seat housing 15. The force of spring 44 is sufficient to provide a slight plastic flow of the seal ring 38 to effect mating between the seal ring and the piston member 35.

A bumper assembly is positioned in the path of the seal member as it moves toward open position of the main valve member. The bumper assembly is provided by bumper washer 43, by a bumper member 46 and resilient means such as the bumper rubber 47 supporting the bumper member in the path of the bumper washer as the piston member moves toward valve-opening position. The upper end of the bumper member 46 has a surface 48 adapted to engage the downwardly facing surface 49 of the bumper washer when the piston moves toward valve-opening position. As these parts are engaged, the bumper rubber 47, which is confined between the inlet thimble assembly and a sleeve 51 depending from the bumper member 46, is compressed. It will be noted that the confinement of the bumper rubber between the sleeve and thimble is such as to permit it to substantially double in radial dimension before completely filling the cavity between the sleeve and thimble. In this manner a substantial travel of the piston is permitted while the bumper assembly and the spring 44 build up resistance to downward movement of the piston. As soon as the bumper rubber 47 is completely compressed, downward movement of the bumper member is substantially arrested. By having this arresting movement transmitted from the bumper member through the bumper washer to the seal 38, the frictional engagement of the seal with the cylinder is increased to thereby absorb a portion of the energy of the downwardly moving piston. It has been found that this arrangement of transmitting the impact force to the piston rubber will result in the imbedding in the rubber of any particles which were too small to be wiped from the cylinder wall. This imbedding will minimize scoring of the cylinder wall.

The upper extremity of the cylinder wall is provided with an enlarged diameter section 52. This results in a shoulder 53 which acts as a wiper to wipe solid particles from the exterior of the seal member 38. Said solid particles may be trash, or may be salts which tend to build up in some wells.

The piston member 35 is constructed in a manner to direct any solid particles which occur in the chamber 33 above the piston on through the valve.

It is conventional in valves of the type illustrated to have a bleed port 54 which extends through the piston member 35 and the valve stem to place the upper end of the cylinder 33 in communication with the passageway through the valve downstream of the main valve seat 27. In order to direct trash through this bleed passageway, the upper end of piston member 35 is dished in, as shown at 55, so that any particles of trash falling on the top of the cylinder will tend to be directed to the bleed passageway.

To permit free passage of trash, the bleed passageway should be as large as possible. On the other hand, the size of this passageway controls the speed with which the piston will snap the main valve member to full open position. For this reason, the bleed passageway through the piston member 35 and the stem 34 is made large and a depending member 56 extends into the inlet of the bleed passageway. The length of the member 56 is such that it will effectively reduce the size of the bleed passageway until the main valve member 28 is almost in fully open position. As the main valve member moves to fully open position, the piston 35 will move below the depending member 56 to clear the bleed passageway and open up the inlet to the bleed passageway to thus permit any trash to freely move into the bleed passageway and pass through the valve. It will be noted that there is a reduced diameter section 57 on the depending member 56 which begins approximately at the lowermost level of the dished in portion 55 of piston 35. This prevents any buildup or accumulation of trash which might interfere with free movement of the piston.

From the valve as thus far explained, it is apparent that the lower face of the control piston is always exposed to casing pressure, and the upper face of the piston is always exposed to at least the pressure in the tubing. In accordance with conventional construction in valves of this type, a pilot valve indicated generally at 58 is provided for selectively admitting casing pressure to the closed end of cylinder 31 to thus selectively increase the pressure above the piston to casing pressure. It might be noted at the outset that the valve 58 may be utilized as a pilot valve for controlling a main valve such as main valve 28, or, in the alternative, the pilot valve may be used as a flow valve. In other words, if the control piston be omitted and the lower end of the valve seat housing 15 connected directly to the tubing, the valve may be used as a flow valve. An inlet into the pilot valve is provided by a port 59 in the valve seat housing 15. An outlet is provided which for purposes of considering the operation of the pilot valve may be considered to be the outlet 61 in the valve seat housing. Of course, the outlet 61 communicates through the valve stem 34 with the outlet 21 of the main valve. A passageway connects the inlet 59 and the outlet 61. This passageway is provided by a plurality of bores 62 through the valve seat housing and opening into the top of chamber 33. The bore 62 communicates with the spring housing so that tubing pressure or downstream pressure will normally be applied to the bellows 63 when the valve is closed. The pilot valve passageway is completed by the valve seat member shown at 64. The member 64 is tubular in form and is held in a tubular bore 65 in valve seat housing 15 by a valve seat lock pin 66. This pin extends into the seat member from the exterior of the housing. A pair of O-rings 67 provide spaced seals between the valve seat member and the bore 65. The seals are positioned to bridge the inlet 59 and the valve seat member has a plurality of ports 68 to permit casing fluid to flow into the bore 69 which extends upwardly from the ports 68 to the top of the valve seat member.

A valve seat is provided at the top of the valve seat member by an upwardly and outwardly flaring frusto-conical surface 71. A valve member is provided by a ball 72 which cooperates with seat 71 to control flow therethrough. By using a spherical ball and the frusto-conical seat surface 71, it will be apparent that the effective area of valve seat 71 will be dependent upon the diameter of ball 72. Thus, by selecting the proper diameter of ball a desired spread characteristic between opening and closing of the pilot valve may be obtained.

It will be noted that the seating surface 71 faces downstream so that pressure fluid from the inlet 59 tends to move the ball from its seat. As the ball 72 is free, a reversal in pressure differential which would result in reverse flow through the pilot valve will be prevented by the ball valve member 72 acting as a check valve.

A valve stem 73 is mounted in the housing on the downstream side of the seat 71. The ball 72 is positioned between the seat 71 and the stem 73. Means are provided for resiliently urging the valve stem toward the seat. This means may include the spring 74 held under compression between jam nuts 75 on the valve stem and the lower extremity of the upper packing adapter 17. Also included in the means for resiliently urging the valve stem toward the seat is a bellows 63 connected to the valve stem and exposed to pressure fluid downstream of the seat 71.

It will be apparent that in order to have the spring 74 exert the same force with different size balls, it will be necessary to change the effective length of the valve stem 73. For this reason, the valve stem has a cylindrical opening 76 in its lower end. A plunger 77 is reciprocally mounted in the cylinder 76. This plunger has a head or radially extending flange 78 which is larger than cylinder 76. One or more spacer washers 79 may be introduced between the head 78 and the lower end of stem 73 to change its effective length. An O-ring 80 provides friction between the cylinder 76 and stem to releasably hold the plunger in position. As the plunger will be assembled under atmospheric conditions, it will be appreciated that in the well a differential will exist across the friction ring and the plunger will be firmly held against the stem 73.

Preferably, the lower face of the washer or head 78 has a downwardly facing conical surface 81 which engages the ball 72. With this configuration, the valve seat surface 71 and the conical surface 81 combine to form a cage for holding the ball 72 in a position to cooperate with seat 71. Travel of the ball 72 to full open position is normally about $1/16$ of an inch. Under the most adverse conditions the travel will be about $1/8$ of an inch. Thus, even with a relatively small ball the surfaces 71 and 81 will confine positioning of the ball to the proper area. Of course, any desired type of cage could be provided to hold the ball over seat 71.

In operation the valve is run into the tubing which includes the mandrel 11 on a wire line. The wire line is attached to a wireline latch assembly, a portion of which is indicated generally at 82 in FIGURE 1. The valve is run into the side pocket 10 and landed in the position shown in FIGURE 1 in which the upper and lower spaced seals 83 and 84, respectively, will seal between the valve and the side pocket above and below the inlet 23. Thereafter, the fluid within the well may be lifted by gas introduced through the gas lift valve in the conventional manner. The pilot valve will be set to open at a selected casing pressure. This pressure will depend upon the size of the ball 72 and the amount of tubing pressure effective on the bellows 63 and ball 72. For instance, if ball 72 have an effective area equal to the area of bellows 63 and the bellows 63 be charged at atmospheric pressure, the effect of tubing pressure will be substantially eliminated and the valve will open and close in response to casing pressure only. In other words, the spread of the valve will be approximately zero. If it is desired to have the valve closed after casing pressure has dropped a selected number of pounds, the ball 72 will be slightly smaller to provide an effective area across the valve member less than the area of the bellows. Then, when the valve 72 opens, a casing pressure will become effective on the bellows and will hold the pilot valve in open position until the casing pressure has dropped the selected number of pounds to permit the pilot valve to close. It will be apparent that the ball will seat in random orientation, and thus a new surface will be constantly presented to the valve seat. If a slight nick is incurred in the ball, the chance of seating on that exact point is very small. The change in spread characteristics may be readily accomplished in the field by changing the size of ball.

Prior to opening of the pilot valve, tubing pressure will be present in chamber 33 and casing pressure is effective on the bottom side of the piston 35. The differential across the seal member 38 urges the seal toward the larger end of the piston member 35. As this tightly wedges the seal between converging surfaces, the seal is capable of withstanding a substantial differential. As the pilot valve unseats, the pressure within chamber 33 quickly increases to casing pressure. The areas exposed to pressure on the opposite sides of piston 35 and on the opposite sides of the main valve 28 are such that an unbalance of force is now created which rapidly moves the main valve to full open position. In so moving, it might be noted that the shoulder 53 will tend to wipe the upper edge of the resilient seal 38 to remove trash therefrom. This trash will tend to fall on top of the piston member 35. Prior to opening and during opening movement the depending member 56 extends into bleed port 54 in the valve stem 34 and permits only a slight bleed of fluid therepast. As soon as the valve reaches full open position, however, the piston member 35 moves far enough down to provide a full unobstructed opening to permit flow of trash through the valve. The dished shape of the top of the piston member 35 will direct any trash present above the piston to the bleed, and it will pass on through the valve.

As the piston moves toward open position, the bumper washer moves into engagement with the bumper member and begins to compress the bumper rubber. Thus, the inertia of the opening valve member is absorbed by the spring 44 and by the bumper rubber. If the bumper rubber is completely compressed within its confined chamber, it arrests further downward movement of the bumper washer. This arresting force is thus transmitted to the seal member 38 and results in imbedding of any material which lies between the seal member and the cylinder. After arresting downward movement, the piston will be permitted to move upwardly and seek an equilibrium position. At this time fluid from the casing will be flowing through the main valve, past the check valve indicated generally at 85 in the bottom cap, and thence into the tubing.

After casing pressure drops to the desired pressure, as determined by the spread selected by the size of ball 72, the pilot spring 74 will return the pilot ball 72 to seated position. The pressure in chamber 33 will then quickly drop to tubing pressure and the differential in casing pressure and tubing pressure across the piston 35 will move the piston to closed position. It might be noted that the relationship of the areas exposed to casing and tubing pressure are preferably such that the main valve will begin to move toward closed position before the full differential is built up across the piston seal 38. This will permit the piston to move back to valve-closing position before the full differential occurs thereacross. As the valve moves to open position under a condition of low differential across the seal member, it will be appreciated that this design permits movement of the piston seal 38 under conditions of low pressure differential. Thus, the design is such that low friction between the piston seal 38 and the cylinder is present at the time of opening and closing.

In the event of tubing pressure exceeding casing pressure, the pilot valve ball 72 will be held on its seat by this reverse pressure condition to prevent reverse flow therethrough. Also, the main back check valve 85 will be seated to prevent reverse flow through the entire valve. In view of the position of the main back check valve 85 in the preferred embodiment, it will be apparent that the greatest advantage of the use of a free ball as a back check as well as a control valve member will occur when the structure herein referred to as a pilot valve is used as a main flow valve, or where the outlet from the pilot valve communicates with the tubing through a passageway which is not controlled by a main check valve.

Referring now to FIGURE 3, there is shown a flow valve constructed in accordance with this invention. The construction and operation of the flow valve is substantially identical with that of the pilot valve shown in FIGURE 2. A housing is provided by the bellows housing 101, the spring housing 102, and the valve seat sub 103. A flow passageway through the valve extends from the plural inlets 104 to the outlet 105. This passageway includes a bore 106 extending upwardly from the inlets 104 to the valve seat 107. The valve seat is provided by a frusto-conical surface facing downstream as previously discussed. The spring and bellows housing prevent upward escape of fluid, and the flow passageway is completed by one or more passageways 108 extending through the valve seat sub from the outlet 105 to the top of the sub.

A ball 109 provides a valve member cooperating with the seat 107. As previously explained, the size of the ball will determine the spread characteristics of the valve member.

A valve stem 111 is urged toward the valve seat by a resilient means provided by the spring 112 and the bellows 113.

A slightly different means is shown in this embodiment for changing the effective length of the valve stem 111 with change in ball size. In this instance, the stem has its lower end threaded over a considerable length as shown at 111a, and a standoff adapter 114 provides the lower end of the valve stem. The adapter is screwed onto the stem to the desired position and a locking nut 115 locks it in position. Again the lower end of the stem as provided by the lower face 114a of adapter 114 is cone-shaped to cooperate with the seat 107 and provide a cage for retaining the ball valve in open position.

In addition to the ease with which the spread characteristics of this valve may be changed, and the innumerable seating surfaces of ball 109, it is apparent that the ball 109 will function fully both as a flow valve and as a back check valve to prevent reverse flow through the valve.

The foregoing disclosure and description of the invention is illustrative and explanatory thereof and various changes in the size, shape and materials, as well as in the details of the illustrated construction, may be made within the scope of the appended claims without departing from the spirit of the invention.

We claim:
1. In a gas lift valve having a housing,
a main valve member controlled by a piston exposed to upstream pressure on one side, and a bleed passage exposing the other side of the piston to pressure downstream of the main valve,
the improvement which resides in the combination therewith of,
a pilot gas passageway exposing said other side of the piston to pressure exterior of the valve,
a valve seat across said pilot gas passageway and having a seating surface facing downstream,
a valve stem mounted in the housing on the downstream side of said valve seat,
a free ball between said stem and seat providing a valve member cooperable with said valve seat to control flow through said passageway, and
means including a bellows exposed to pressure fluid downstream of said seat resiliently urging said valve stem toward said seat.

2. In a gas lift valve having a housing,
a main valve member controlled by a piston exposed to upstream pressure on one side and a bleed passage exposing the other side of the piston to pressure downstream of the main valve,
the improvement which resides in the combination therewith of,
a pilot gas passageway exposing said other side of the piston to pressure exterior of the valve,
a valve seat across said pilot gas passageway and having a seating surface facing downstream,
a valve stem mounted in the housing on the downstream side of said valve seat,
a free ball between said stem and seat providing a valve member cooperable with said valve seat to control flow through said passageway, and
means including a bellows containing atmospheric pressure exposed to pressure fluid downstream of said seat providing a pressure-responsive means and a resilient means urging said valve stem toward said seat.

References Cited in the file of this patent
UNITED STATES PATENTS

| | | |
|---|---|---|
| 2,122,706 | Armstrong | July 5, 1938 |
| 2,714,392 | Mercier | Aug. 2, 1955 |
| 2,744,538 | Stevenson | May 8, 1956 |
| 2,821,996 | Stevenson | Feb. 4, 1958 |
| 2,888,946 | Barron | June 2, 1959 |
| 2,963,043 | Davis | Dec. 6, 1960 |